(12) United States Patent
Barthel et al.

(10) Patent No.: US 9,411,677 B2
(45) Date of Patent: Aug. 9, 2016

(54) METHOD AND SYSTEM FOR DETECTING ERRORS IN THE TRANSFER OF DATA FROM A TRANSMITTER TO AT LEAST ONE RECEIVER

(71) Applicant: Siemens Aktiengesellschaft, Munich (DE)

(72) Inventors: Herbert Barthel, Herzogenaurach (DE); Wolfgang Schmauss, Rückersdorf (DE); Edgar Sigwart, Amberg (DE); Maximillian Walter, Nürnberg (DE)

(73) Assignee: Siemens Aktiengesellschaft, Munich (DE)

( * ) Notice: Subject to any disclaimer, the term of this patent is extended or adjusted under 35 U.S.C. 154(b) by 51 days.

(21) Appl. No.: 14/301,969

(22) Filed: Jun. 11, 2014

(65) Prior Publication Data

US 2014/0372840 A1    Dec. 18, 2014

(30) Foreign Application Priority Data

Jun. 14, 2013    (EP) .................................... 13172092

(51) Int. Cl.
| | | |
|---|---|---|
| *H03M 13/00* | (2006.01) | |
| *G06F 11/10* | (2006.01) | |
| *H04L 1/00* | (2006.01) | |

(52) U.S. Cl.
CPC .......... *G06F 11/1004* (2013.01); *H04L 1/0045* (2013.01); *H04L 1/0061* (2013.01)

(58) Field of Classification Search
CPC .. G06F 11/1004; H04L 1/0061; H04L 1/0045
See application file for complete search history.

(56) References Cited

U.S. PATENT DOCUMENTS

| | | | |
|---|---|---|---|
| 2006/0256818 A1 | 11/2006 | Apisdorf | |
| 2007/0242614 A1* | 10/2007 | Buettner | H04L 1/0061 370/248 |
| 2009/0103485 A1* | 4/2009 | Singh | H04L 1/0041 370/329 |

FOREIGN PATENT DOCUMENTS

| | | |
|---|---|---|
| EP | 0942569 A2 | 9/1999 |
| WO | WO 2011067381 A1 | 6/2011 |

* cited by examiner

*Primary Examiner* — Sam Rizk
(74) *Attorney, Agent, or Firm* — Cozen O'Connor

(57) ABSTRACT

A method for detecting errors in a transfer of data from a transmitter to at least one receiver includes coding the data together with address information identifying the receiver in a series of data packets and transferring the data and the address information using the data packets. The method also includes generating, at the transmitter, a check value for each data packet and transferring the check value with/in the data packet to the receiver. The method further includes comparing, at the receiver, the check value with an expectation value, wherein an error is detected in the event of a deviation. For each data packet to be transmitted, the method includes calculating a number sequence value from the address information using a first calculation rule, generating the check value from the sequence value using a second calculation rule and transmitting the data packet with the check value to the receiver.

10 Claims, 6 Drawing Sheets

```
CN_incrNR_64 [1] = 6364136223846793005 *(CodeName);
CN_incrNR_64 [1] = 6364136223846793005 *(CN_incrNR_64 [1])* (CodeName);
```
} A

```
CN_incrNR_64 [0] = CN_incrNR_64 [1] + CN_incrNR_64 [2];
CN_incrNR_64 [2] = CN_incrNR_64 [1];
CN_incrNR_64 [1] = CN_incrNR_64 [0];
CN_incrNR_32 = CN_incrNR_64 [0] >> 32;
```
} B

METHOD AND SYSTEM FOR DETECTING ERRORS IN THE TRANSFER OF DATA FROM A TRANSMITTER TO AT LEAST ONE RECEIVER

FIELD OF INVENTION

The invention relates to a system and method for detecting errors in the transfer of data from a transmitter to one or more receivers. Specifically, the invention relates to the technical field of failsafe communication, which is used, inter alia, in the communication between field devices, control components and similar devices in industrial process automation or production automation. A failsafe communication of this type, also referred to as F-communication, is used in particular in safety-related applications, where errors in the communication can result in risks to people, animals or property.

DESCRIPTION OF THE RELATED ART

A protected, packet-switched data transfer, in particular the PROFIsafe protocol, is used in the prior art for failsafe communication. Additional check values (checksums, signatures) are used in the "failsafe" data packets (PDU=Process Data Unit), also referred to as "failsafe process data unit" (F-PDU), wherein checksums (FCS—Frame Check Sequence) or the like, which allow detection of transfer errors, are provided in the protocols of the underlying standard communication layer (Ethernet, Industrial Ethernet, PROFInet or the like).

An address or routing error in these "lower" protocol layers, i.e., outside the aforementioned F-communication data link layer, results in the delivery of a data packet (F-PDU) to the incorrect receiver. In this case, the addresses used by the transmitter to calculate the signature (FCS) do not match the expected values of the receiver. Insofar as the length of the signature (FCS) is at least as long as the number of address bits used for the signature formation, an "error burst" is reliably detected, since a signature formation with a suitable algorithm can reliably detect all error bursts with a length less than the length of the signature (FCS).

In F-communication, safety-oriented data packets, referred to as F-PDUs, are transported in the payload area of the data packets (frames) of the underlying communication; this is also referred to as "containering".

Not only the process data integrity (i.e., intactness), but also the address correctness, must be proven for each safety-related process data unit (F-PDU). As mentioned, both characteristics are checked in an additional data link layer, which is implemented above the underlying standard protocol. This data link layer is therefore based on the described, ordered, reliable standard communication connection, the correct mode of operation of which must merely be monitored. For this purpose, all safety-related process data units (F-PDUs) are provided in the prior art with an additional signature (F-CRC—Failsafe Cyclic Redundancy Check), which is calculated, for example, using a known "Cyclic Redundancy Check" method (CRC). In the event of a negative check in the receiver, the F-PDU is discarded and the system is shut down or switched to a different safe condition.

The source and/or destination address (F-addresses) of the F-data packet (F-PDU) and a current sequence number (F-sequence number) are included in the signature (F-CRC). The F-addresses are generally not identical to the addresses of the data packets of the underlying standard communication addresses. While the last-mentioned are, or at least contain, for example, the IP addresses of the devices involved in the communication, the F-addresses relate mostly to logical processes or logical units or the like of the safety-oriented applications of the devices.

The data relevant to the F-signature (F-CRC), i.e., the F-addresses and the F-sequence number, are referred to as "a priori information", i.e., data that are known to both the transmitter and the receiver at any time. These data, i.e., the F-addresses and F-sequence numbers included in the check value (F-CRCs), do not therefore have to be explicitly dispatched and for that reason are not necessarily a component of the data packets (F-PDUs).

It has become evident that additional errors (data corruption), which occur in the transfer of the message (F-PDU) or the signature (F-CRC) in the case of an implicit protection of the address, can result in specific cases in a non-detectability of the error. The residual error probability, which indicates the probability of such an error not being detected in the address, depends on the "error pattern" which occurs due to the address error.

The error pattern of the address errors depends in turn on the allocation of the addresses and on other configuration settings. The error pattern is therefore not random, but is in some cases even constant over the entire lifetime of a system, i.e., particularly if the addresses do not change during the lifetime of the system. In other words, depending on the address used, the probability of an address error being detected may, in unfavorable cases, be substantially worse than statistically predicted for the error detection method. Together with the fact that the addresses are frequently constant in industrial communication, the required residual error probabilities cannot therefore often be achieved.

SUMMARY OF THE INVENTION

An object of the present invention, particularly in the transfer of a multiplicity of data packets with the same F-addresses, is to reduce the statistical average residual error probability, particularly in cases where an unfavorable allocation of the addresses used in the system results in a worse residual error probability of individual data packets.

To do this, a method is proposed according to the invention with which, due to an address error occurring at a random time, a random error pattern also results, so that a minimum average error detection over time is achieved. This is then essentially independent from the selection of the F-addresses or other configuration settings.

The achievement of the object according to the invention is therefore based on the novel realization that, in the event of a concurrence of address and data integrity errors, the error detection is substantially worse than the error detection assumed for a selected signature method. In the example of a 24-bit signature, the error detection may be up to a factor of 100,000 ($10^5$) worse due to the unfavorable preconditions described; for a 32-bit signature, this deterioration may even be 10,000,000 or $10^7$.

The method proposed for achieving the object and the proposed system initially use the mechanisms of an already existing, underlying communication, i.e., the address filtering and address checking of a standard layer (e.g., Ethernet, CAN bus, etc.) for the address protection at device level. According to the invention, different number sequence values based on the F-addresses, rather than the previously used F-addresses, are used for the calculation of the signature, either for each data packet (F-PDU) with safety-oriented addresses, i.e., F-addresses, for each time segment or each communication cycle (sequence or series of data packets). As a result, the error patterns differ in terms of the address information (F-address) for each data packet or for each communication cycle (series of data packets), even if the address information, i.e., the F-addresses, remains the same. A better statistical average error detection is thus obtained, even in the case of unfavorable configuration of the F-addresses.

The object is achieved in particular by a system and method of the claimed invention. A method for detecting errors in the transfer of data from a transmitter to at least one receiver includes coding the data with the address information identifying the receiver in a series of safety-oriented data packets (F-PDUs—Failsafe Process Data Units) and transferring the data using the safety-oriented data packets. The method also includes generating, at the transmitter, at least one check value for each safety-oriented data packet and transferring the check value with or in the data packet to the receiver, wherein the check value is compared by the receiver with an expected value, and wherein an error is detected in the event of a deviation.

Specifically, in a first step of the method, a number sequence value is calculated by the transmitter from the safety-oriented address information using a first calculation rule for each safety-oriented data packet to be transferred and the check value is generated from this number sequence value using a second calculation rule, wherein the first calculation rule is formed in such a way that a modified number sequence value (shuffle) is obtained for each data packet or each series of data packets. In a second step of the method, the data packet is transferred with the check value to the receiver.

In a third step of the method, the number sequence value is calculated by the receiver from the safety-oriented address information of the safety-oriented data packet using the first calculation rule. The expected value is generated from the number sequence value using the second calculation rule and compared with the check value. Depending on the first calculation rule, a modified number sequence value and, therefore, a modified check value also are formed following the processing of a data packet or sequence of data packets.

The method of the claimed invention therefore ensures that the error patterns of the individual address relations in the communication are not constant throughout the duration of the communication, but run through many or even all possible error patterns over the time. As a result, the error detection is always better on average over time than the error detection required for safety engineering purposes. Using the method, the address information used for the calculation (CRC formation) of the check value is converted into a continuously varying number sequence value which differs for each data packet or each series of data packets.

Even with constant address information and with constant data and other parameters of the check value formation, it is guaranteed by the method that the number sequence value included in the calculation of the check value, for example in the event of a transposition of addresses, produces a different error pattern for each data packet. For example, a bitwise exclusive OR operation used in a CRC calculation inevitably produces different results. As a result, the error pattern of the address values of any given users is more or less equally distributed, even if the addresses in the system are unfavorably configured.

The object is furthermore achieved by a system for detecting errors in the transfer of data from a transmitter to at least one receiver. The transmitter is configured to transmit the data in a series of safety-oriented data packets (F-PDUs—Failsafe Process Data Units) to the receiver. The data packets comprise safety-oriented address information identifying the receiver ("F-addresses") and a check value generated by the transmitter and to be evaluated by the receiver. The receiver is configured to compare the check value received along with the respective safety-oriented data packet with a self-generated expected value. The comparison between the check value and the expected value, in the event of a deviation, results in the detection of errors in the transfer.

The transmitter is further configured to calculate, for each data packet to be transferred, a number sequence value from the address information using a first calculation rule and to form the check value from this number sequence value using a second calculation rule in a first step. The first calculation rule is formed in such a way that a modified number sequence value (shuffle) is produced for each data packet or each series of data packets. The transmitter is configured to transmit the data packet with the check value to the receiver in a second step. The receiver is similarly configured to calculate its own numerical sequence value from the address information using the first calculation rule. The receiver is also configured to generate the expected value from this own number sequence value using the second calculation rule and, to compare the check value received along with the data packet with the expected value in a third step. A modified number sequence value and therefore also a modified check value are thereby obtained in the system following the processing of a data packet or sequence of data packets, even in the case of constant address information. The advantages that have already been indicated for the method according to the invention can be implemented with a system of this type.

Further features and advantages of the method according to the invention are also described and claimed, and the features and advantages also apply accordingly to the system according to the invention. For example, the number sequence value is advantageously reformed separately in both the transmitter and the receiver using separately occurring address information, so that the data on which the number sequence value formation is based do not have to be transferred with a data packet and cannot therefore be exposed to any communication error on the communication path.

Furthermore, the number sequence value is advantageously reformed in each case from preceding number sequence values, in particular—for example through summation—from the two number sequence values used immediately before, using the first calculation rule, which favors the statistical fluctuation of any error patterns and therefore further improves the error detection on average over time.

To form the first number sequence values, in particular the first two number sequence values, separate start calculation rules are then preferably provided, wherein the address information is advantageously included in the generation of the first and/or second number sequence value following a reset or following an initialization of the data transfer, so that the information is already implicitly taken into account in the subsequent number sequence values and therefore no longer needs to be explicitly included in the first calculation rule, but is automatically incorporated into the calculation of each subsequent number sequence value.

A serial number (sequence number or the like) of the relevant data packet or a serial number of a relevant sequence (series) of data packets is advantageously used to form the number sequence value. The sequence number is also advantageously not transferred together with the data packet to be checked, so that the determination or updating of the sequence number in the transmitter and the receiver are similarly carried out independently from one another.

A further advantageous variant in the formation of the number sequence value is obtained if an increment of the sequence number derived from the address information is used, i.e., the increment represents a constant. However, an increment derived from the address information in this way can be formed separately by both the transmitter and the receiver without the increment having to be transferred in a data packet from the transmitter to the receiver or vice versa.

If the number range of all communication addresses used for the safety-oriented communication is smaller than the number range of the signature, the address value can use the "differential number range," i.e., for example, in cases where 32 bits are reserved for the address information, the address space actually used is, however, 16 bits only, the remaining 16 bits can be used for the number sequence value. The check value is then calculated over all the bits reserved for the address information (in this case 32 bits), whereby the number sequence value is then taken into account automatically in the generation of the check value. In such a case, less stringent requirements can be imposed on the generation of the number sequence value with no deterioration in the error detection on average over time. Moreover, the second calculation rule does not have to be modified.

The address information of the receiver is advantageously used to calculate the number sequence value. Additionally, or alternatively, the data (F-data; payload of the safety-oriented communication) and/or the address information of the transmitter can be included in the generation of the check value or the expected value, resulting in a statistically better variation in the check value or the expected value generated for control purposes, particularly in cases where different data or data values are also transferred in different data packets or different address information of the transmitter occurs.

BRIEF DESCRIPTION OF THE DRAWINGS

Example embodiments of the method according to the invention are explained below with reference to the drawings. The drawings are also used to explain systems according to the invention. In the drawing.

DETAILED DESCRIPTION OF THE PRESENTLY PREFERRED EMBODIMENTS

Figure 1:
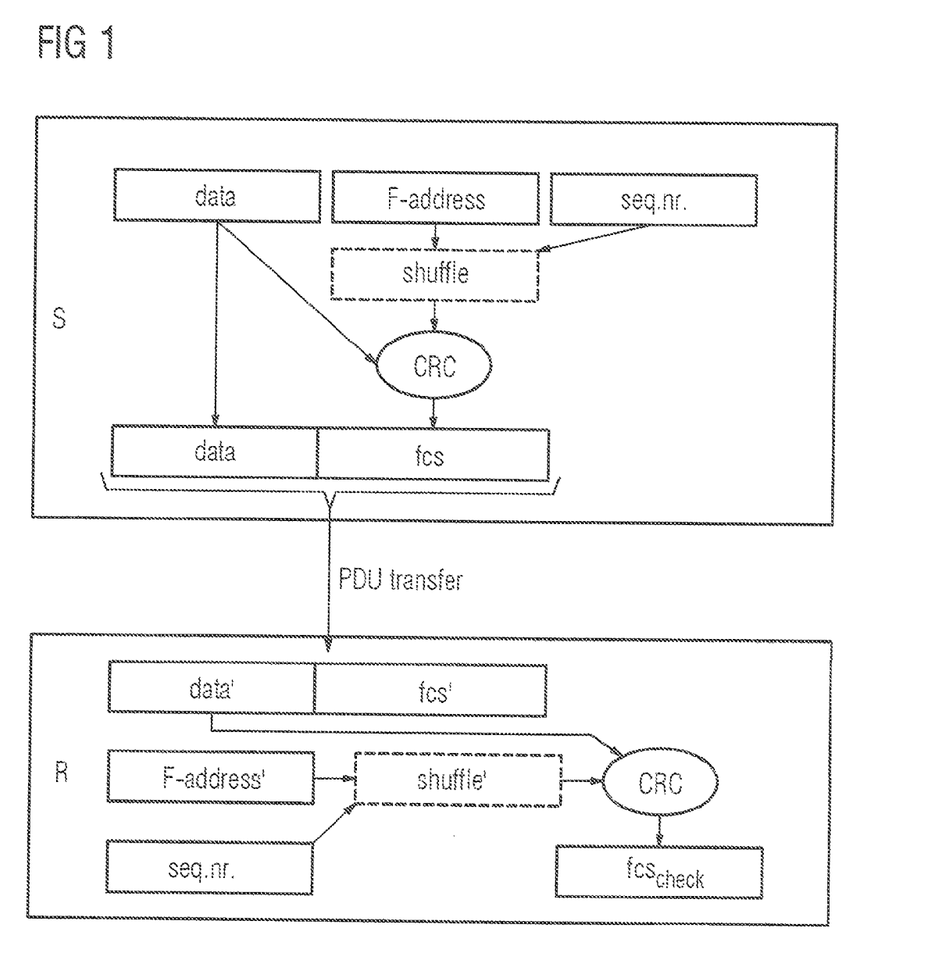
FIG. 1 shows the generation, transfer and evaluation of a data packet in accordance with one embodiment of the present invention.

FIG. 1 shows schematically the generation, transfer and evaluation of a data packet PDU (Process Data Unit). The data packet PDU consists of a data part and a check value FCS (Frame Check Sequence), wherein it is assumed that the data part and the check value FCS are transferred using a known safety-oriented transfer method from the transmitter S to the receiver R ("transfer"). The data part and the check value FCS therefore represent the useful information ("payload") of a data packet, such as a frame constructed according to the TCP/IP protocol used in the Ethernet.

The data part, which is intended to be the actual payload of the safe transfer channel, is incorporated unchanged into the safety-oriented data packet in the transmitter S. In addition, a check value FCS is generated which is formed in the present example embodiment using the CRC method (CRC=Cyclic Redundancy Check). However, in the CRC method, the check value FCS is generated from the data part and a number sequence value shuffle, wherein the number sequence value is formed using a first calculation rule from the address information F-address and a sequence number seq.nr. The formation of the check value FCS from the number sequence value shuffle and the data part, i.e., the CRC calculation, represents a second calculation rule. While the second calculation rule, i.e., the CRC calculation, represents a standard method, the first calculation rule for forming the number sequence value will be explained in detail later with reference to FIGS. 3 to 5.

Following the transfer of the data packet PDU, the received data packet PDU is evaluated in the receiver. For example, the received data part is indicated in the figure in the receiver R by the reference data' and the received check value by the reference FCS', whereby it is intended to be explained that an error may have unintentionally occurred during the transfer, which may have adversely affected the data part and/or the check value FCS. From the information already present in the receiver R relating to the communication address F-address' and the sequence number seq.nr, a number sequence value shuffle' is also formed in the receiver R and is converted using the same CRC method and using the received data part' into the expected value $FCS_{check}$, which is then compared with the received check value FCS', wherein a deviation between the two values indicates an error.

The formation of the number sequence value shuffle and its incorporation into the generation of the check value is novel compared with known safety-oriented communication methods, and therefore the number sequence value shuffle is shown in the figures with a broken-line border.

Figure 2:
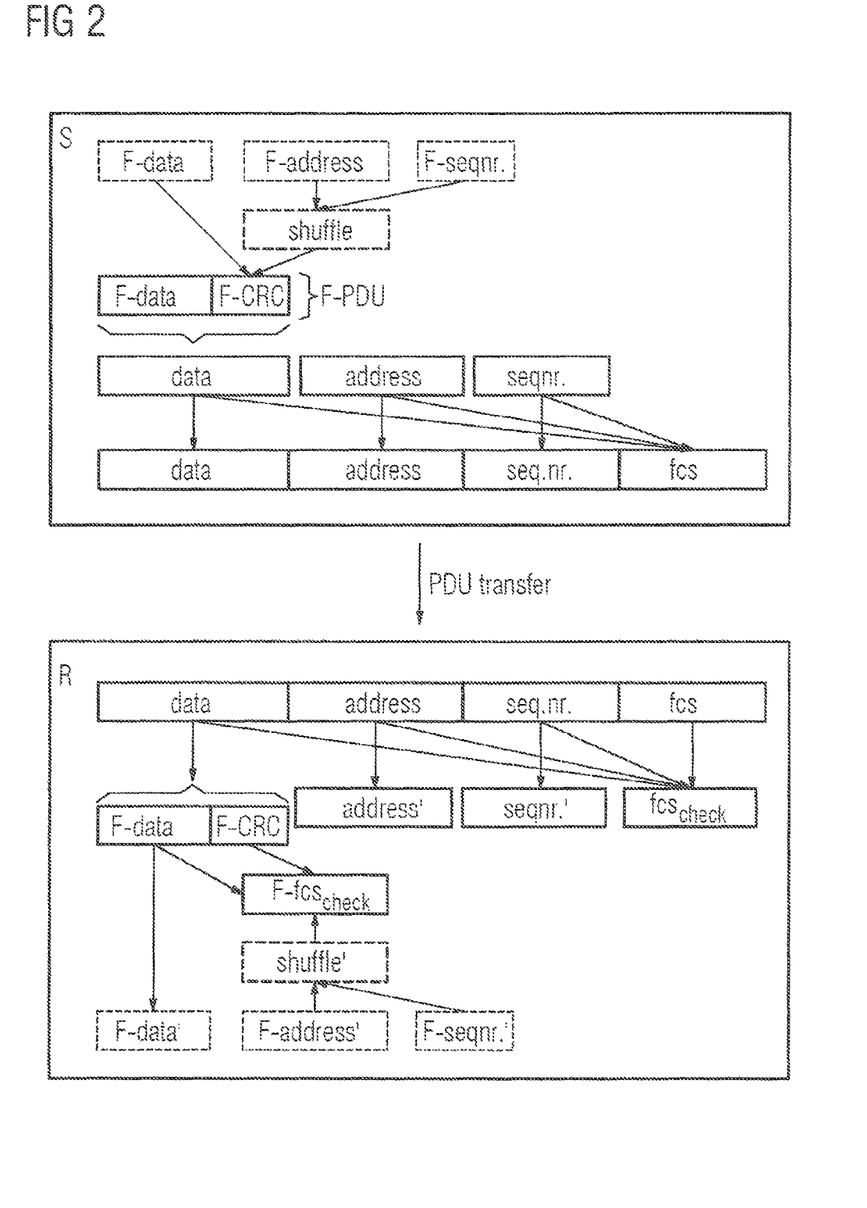
FIG. 2 shows the transfer of the data packet constructed according to the invention using a standard transfer method or standard communication layer in accordance with one embodiment of the present invention.

FIG. 2 shows a more detailed representation to explain the use of an underlying communication connection. The data fields known from FIG. 1 are shown in FIG. 2 with broken lines, wherein the data packet PDU generated in FIG. 1 is shown in FIG. 2 as a "safety-oriented" data packet F-PDU. In the new data packet, this safety-oriented data packet F-PDU represents the useful information (payload) of the standard data transfer method, wherein, in FIG. 2, the safety-oriented data packet F-PDU, in contrast to the data packet PDU in FIG. 1, initially contains a checksum F-CRC, which is formed at least from the number sequence value shuffle and the data, instead of the check value FCS. This checksum F-CRC is incorporated into the signature formation of the underlying communication, wherein the check value FCS is generated from the "payload" data, including the safety-oriented payload F-data and the checksum F-CRC, and other components (address, seq.nr.) of the underlying communication.

It becomes clear here that, through the combination of the method according to the invention with a conventional communication infrastructure, which already carries out a check value generation with the second calculation rule, the generation of the check value remains unchanged in lower protocol layers. In the receiver, however, the expected value $F\text{-}FCS_{check}$ must be generated in higher protocol layers ("F-layer") and must be compared with the received check value FCS or a check value $FCS_{check}$ derived therefrom.

A variant of the first calculation rule for forming the number sequence value shuffle is explained below in each case with reference to FIGS. 3-6.

Figure 3:
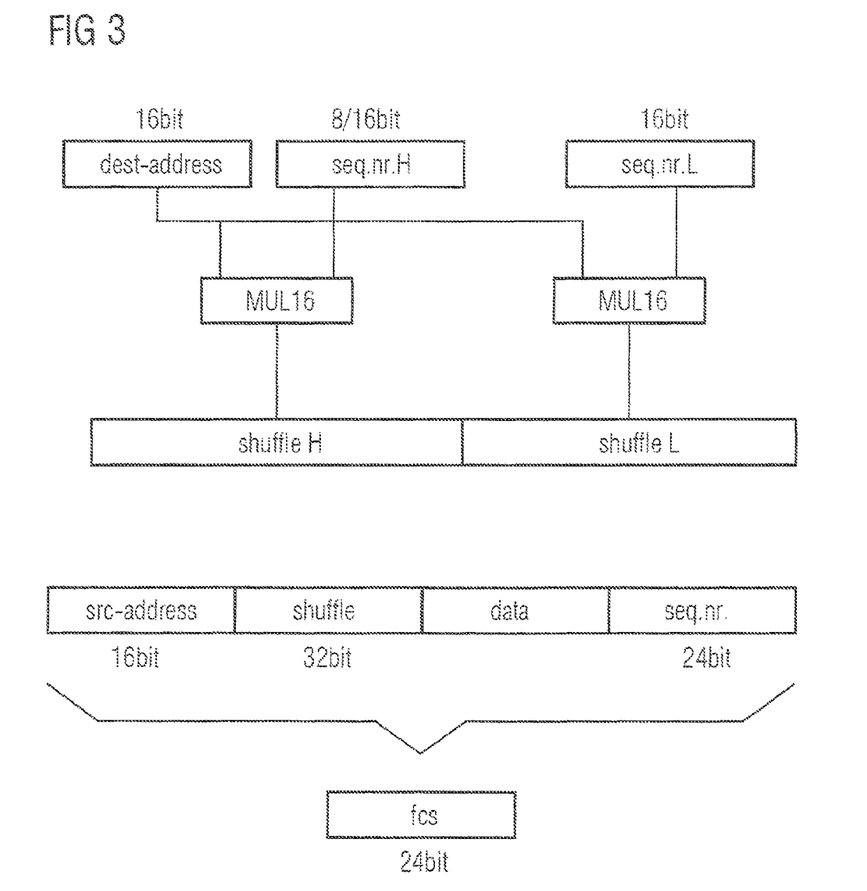
FIGS. 3-5 show different variants for the generation of the number sequence value in accordance with one embodiment of the present invention.

In the example embodiment according to FIG. 3, the destination communication address dest-address is multiplied by the more significant bits of the sequence number seq.nr., wherein the multiplication result forms the more significant bits of the number sequence value shuffle. The less significant bits of the number sequence value shuffle are formed by multiplying the destination communication address dest-address by the less significant hits of the sequence number seq.nr. The number sequence value shuffle is then used together with the communication address src-address of the transmitter S, the data part and the sequence number seq.nr. to form the check value FCS. In one embodiment, the second calculation rule used for this purpose is a CRC method.

Figure 4:
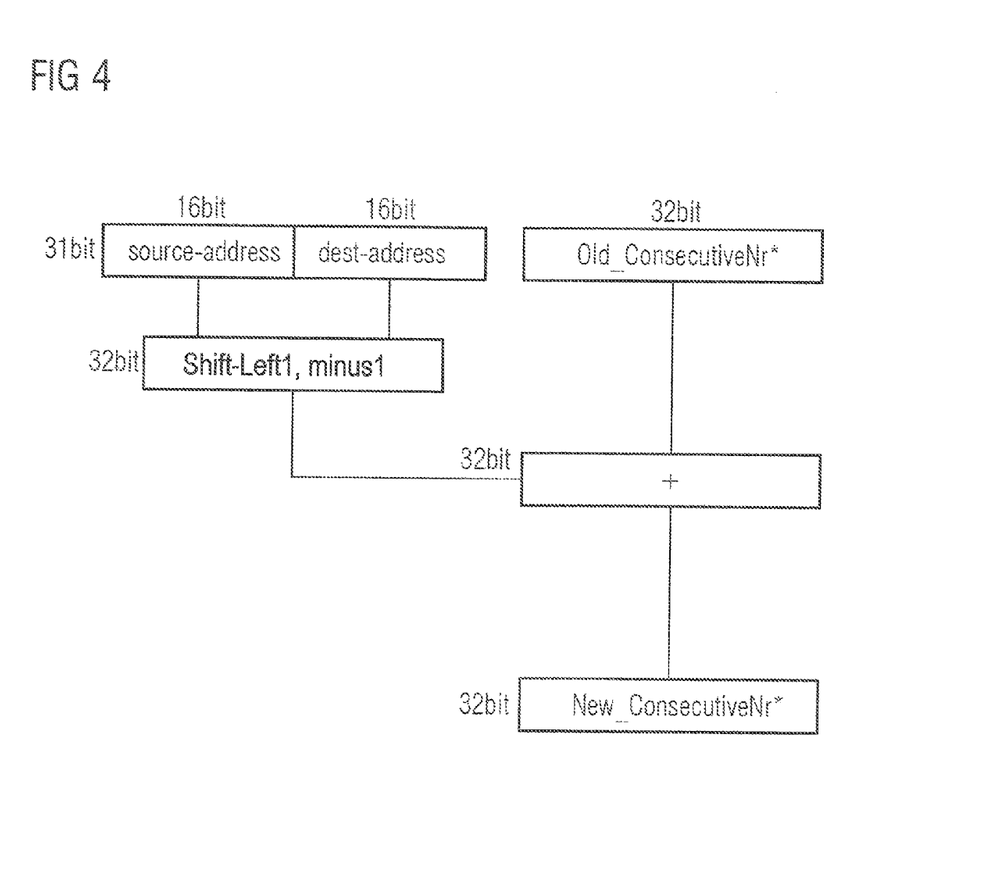

Whereas a continuous sequence number seq.nr. is used in the example in FIG. 3, which is incremented, for example, with each F-data packet or each sequence of F-data packets and, in particular, may also be identical to a sequence number used in the underlying communication (see references seqnr. and seq.nr. in FIG. 2), FIG. 4 shows how such a sequence number can be modified for each data packet or for each series of data packets using an address-dependent increment of a preceding sequence number (indicated in FIG. 4 by Old_ConsecutiveNr*), wherein the resulting sequence number (in this case with the reference New_ConsecutiveNr*) can take the place of the sequence number seq.nr. in FIGS. 1-3.

In FIG. 4, it is assumed that a value range from 1 to $2^{15-1}$ is used for the communication address, i.e., the underlying address information. This means that the address information can be 31 bits "wide", from which a 32-bit value is formed by a left-shift operation according to the calculation rule from FIG. 4. This manipulated address information is added to the preceding sequence number Old_ConsecutiveNr.*, wherein the overflow is discarded and the new sequence number New_ConsecutiveNr* is obtained as a result. The address information is thereby merged with a "timeliness value", i.e., the sequence number, resulting in a better statistical variation in the number sequence value shuffle and therefore the check value FCS.

Figure 5:
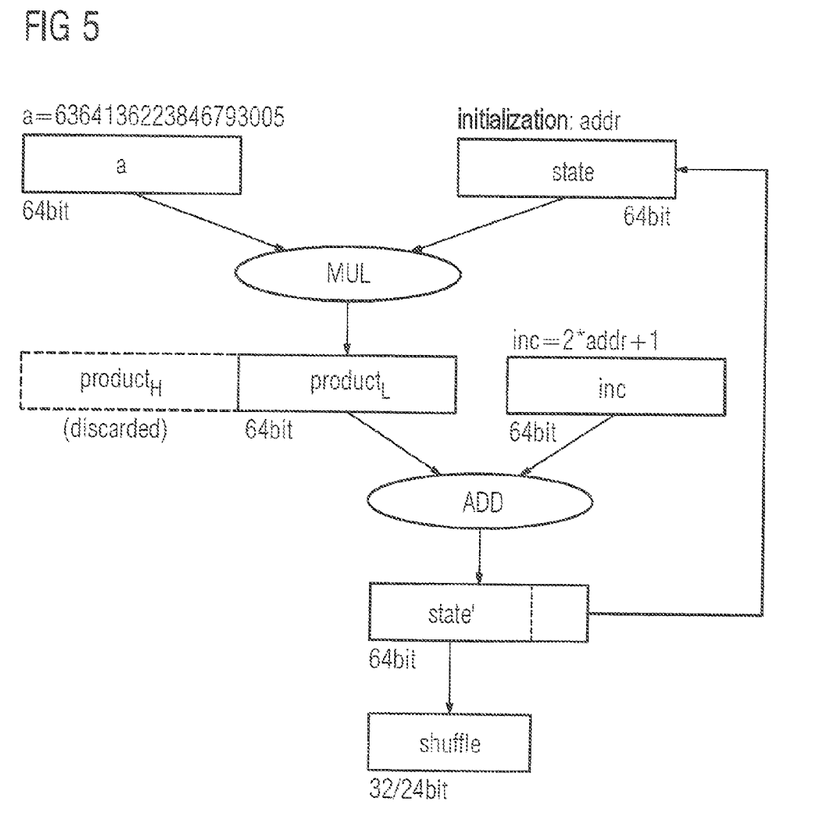

FIG. 5 shows a further example for generating the number sequence value shuffle, wherein a new number sequence value shuffle is generated from a suitably selected constant k and from a start value state and from an address-dependent increment "inc" for each data packet or each series of data packets. In this example, the increment amounts to double the communication information (address information addr)+1. The generated modified status value state' at least partially forms the basis of the next calculation cycle. For the first data packet to be transmitted, the status information state must be suitably assigned (initialized), wherein, for example, the address information addr also used in the further calculation method can also be used.

Figure 6:
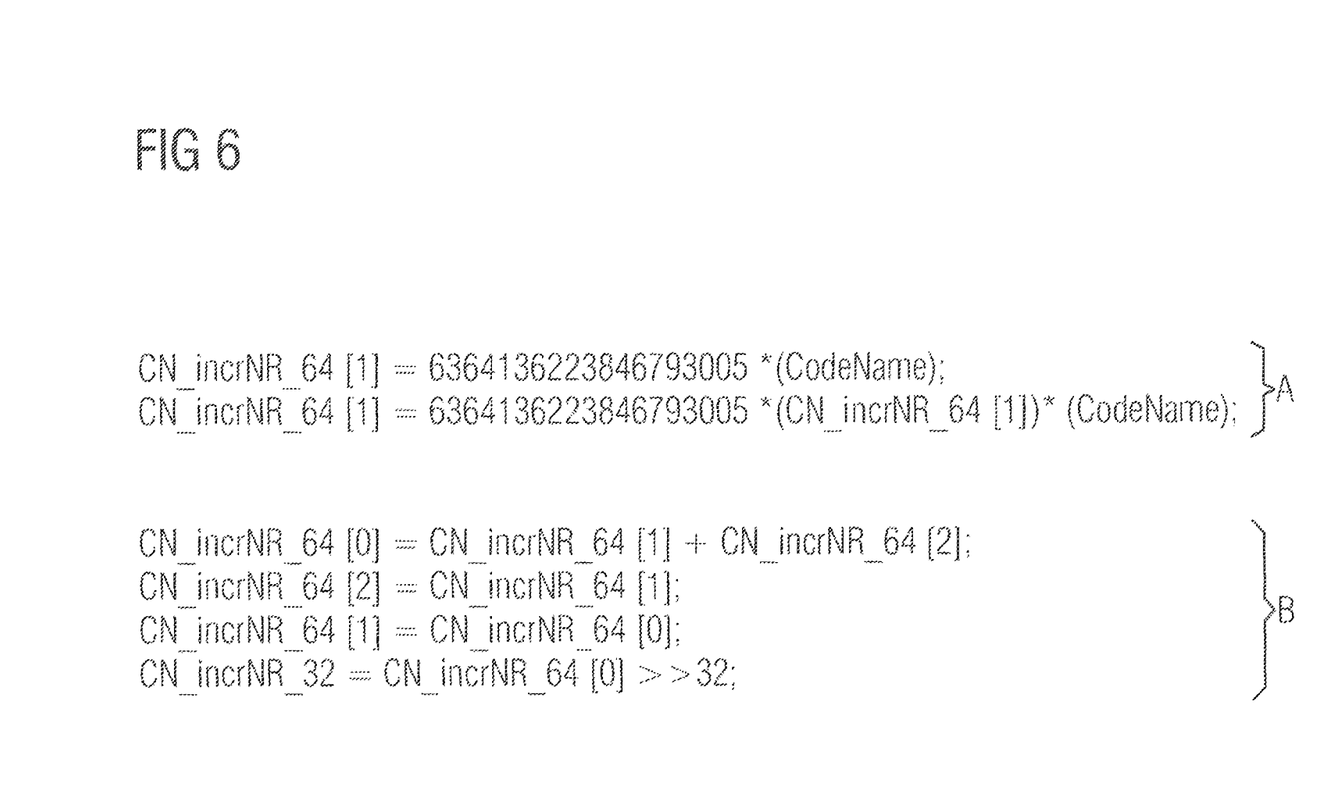
FIG. 6 shows the generation of a number sequence with integrated address information in accordance with one embodiment of the present invention.

Finally, FIG. 6 shows a further variant, wherein a sequence number, indicated here by the reference "CN_inerNR_64 [0]," is generated with integrated address information as the basis for the number sequence value shuffle. The address information is mapped into a variable "CodeName," for example directly or using a signature or hash method. The calculations for the start (initialization) of the communication are shown in a first step A, at which time, there are not yet any preceding sequence numbers "CN_incrNR_64 [1]," "CN_incrNR_64 [2]" from which the number sequence value "CN_incrNR 64 [0]" required for the formation of the number sequence value shuffle can be calculated.

In step A, the address information mapped in the variable "CodeName" and the constant "a" known from FIG. 5 are in each case incorporated multiplicatively into the formation of the two initial values required in step B for the sequence numbers "CN_incrNR_64 [1]," "CN_incrNR_64 [2]." Step B shows the calculation of the required sequence number "CN_incrNR_64 [0]" using the pseudo-preceding values of the sequence numbers generated in step A. This is simply generated through summation of the two preceding values, and any overflow is discarded. The directly preceding value "CN_incrNR_64 [0]" is then dumped and the newly generated sequence number is saved for the next cycle or sequence.

Communication parameters or the like can also be coded in the variable CodeName instead of or in addition to the address information. Furthermore, both the address information and an increment which changes with each data packet or cycle/sequence are implicitly contained in each newly generated sequence number "CN_incrNR_64 [0]." The sequence number "CN_inerNR_64 [0]" can therefore also be directly used as the number sequence value shuffle.

The series of detailed descriptions set forth above are only specific descriptions directed to the feasible embodiments of the present invention, and are not intended to limit the scope of protection of the present invention; and all the equivalent embodiments or modifications made without departing from the technical spirit of the present invention shall be included in the scope of protection of the present invention.

What is claimed is:

1. A method for detecting errors in a transfer of data from a transmitter to at least one receiver, the method comprising:
   coding the data together with address information identifying the receiver in a series of data packets;
   transferring the data and the address information using the data packets;
   generating, at the transmitter, at least one check value for each data packet based on the transferred data and address information;
   transferring the at least one check value including the address information with or in the data packet to the receiver;
   comparing, at the receiver, the at least one check value including the address information with an expectation value, an error being detected in an event of a deviation,
   wherein, for each data packet to be transmitted,
      calculating, at the transmitter, a number sequence value from the address information using a first calculation rule;
      generating the check value including the address information from this number sequence value using a second calculation rule, the first calculation rule being implemented such that a modified number sequence value is obtained for each data packet or each series of data packets;
      transmitting the data packet with the check value including the address information to the receiver;
      calculating, at the receiver, the number sequence value from the address value using the first calculation rule;
      generating the expected value from the number sequence value using the second calculation rule; and
      comparing the expected value with the received check value including the address information.

2. The method of claim 1, wherein the number sequence values are formed in both the transmitter and the receiver using separately occurring address information.

3. The method of claim 1, wherein the number sequence values are reformed in each case from preceding number sequence values using a change rule.

4. The method of claim 1, wherein a sequence number of the relevant data packet or a sequence number of the relevant sequence of data packets is used for the respective formation of the new number sequence value.

5. The method of claim 4, wherein an increment of the sequence number derived from the address information is used for the formation of the number sequence value.

6. The method of claim 3, wherein the sum of preceding number sequence values is used for the formation of the number sequence value.

7. The method of claim 6, wherein, following an initialization, the two preceding number sequence values are calculated from the address information.

8. The method of claim 1, wherein, in cases where the value range of the address information used in a communication arrangement is smaller than the value range reserved for the address information, the number sequence value is inserted into the value range of the address information which is not required before the generation of the check value or the expected value.

9. The method of claim 1, wherein the at least one of (i) data and (ii) address information of the transmitter are also included in the generation of one of (i) the check value including the address information (ii) the expected value.

10. A system for detecting errors in a transmission of data, comprising:
- a transmitter configured to transmit data in a series of data packets; and
- a receiver configured to receive the transmitted data from the transmitter;
- wherein the data packets comprise address information identifying the receiver and a check value generated by the transmitter based on the transferred data and address information and to be evaluated by the receiver,
- wherein the receiver is further configured to compare the received check value including the address information along with the respective data packet with a self-generated expectation value and to detect errors based on the comparison,
- wherein, for each data packet to be transmitted,
  - the transmitter is further configured to calculate a number sequence value from the address information using a first calculation rule and to generate the check value including the address information from this number sequence value using a second calculation rule, the first calculation rule being implemented such that a modified number sequence value is obtained for each data packet or each series of data packets;
  - the transmitter is further configured to transmit the data packet with the check value including the address information to the receiver; and
  - the receiver is further configured to generate the number sequence value from the address information using the first calculation rule, to generate the expected value from this number sequence value using the second calculation rule, and to compare it with the received check value including the address information.

* * * * *